(12) United States Patent
Daimon et al.

(10) Patent No.: US 7,625,659 B2
(45) Date of Patent: Dec. 1, 2009

(54) FUEL CELL, MEMBRANE ELECTRODE ASSEMBLY, CATALYST USED THEREFOR, AND METHOD OF PRODUCING CATALYST

(75) Inventors: Hideo Daimon, Ibaraki (JP); Kohei Ugawa, Ibaraki (JP); Masaki Sekine, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 484 days.

(21) Appl. No.: 11/268,503

(22) Filed: Nov. 8, 2005

(65) Prior Publication Data
US 2006/0099488 A1    May 11, 2006

(30) Foreign Application Priority Data
Nov. 9, 2004  (JP) .............. 2004-325629
Mar. 22, 2005 (JP) .............. 2005-081229

(51) Int. Cl.
*H01M 4/00* (2006.01)
(52) U.S. Cl. .............. 429/40; 429/27; 429/42
(58) Field of Classification Search .............. 429/40, 429/231.4, 27, 42
See application file for complete search history.

(56) References Cited

U.S. PATENT DOCUMENTS

| | | | | |
|---|---|---|---|---|
| 4,359,406 A | * | 11/1982 | Fung | .............. 502/200 |
| 5,906,716 A | * | 5/1999 | Mertesdorf et al. | .............. 204/296 |
| 2004/0197638 A1 | * | 10/2004 | McElrath et al. | .............. 429/44 |
| 2005/0009696 A1 | * | 1/2005 | Mao et al. | .............. 502/325 |
| 2005/0142428 A1 | | 6/2005 | Daimon | |

FOREIGN PATENT DOCUMENTS

| | | |
|---|---|---|
| JP | 56-155645 A | 12/1981 |
| JP | 57-5266 A | 1/1982 |
| JP | 2-111440 A | 4/1990 |
| JP | 9-239278 A | 9/1997 |
| JP | 10-92441 A | 4/1998 |
| JP | 2004-79438 A | 3/2004 |

OTHER PUBLICATIONS

"A New Catalyst for Fuel Cell Reduction of PtRu Catalyst Size to 2nm by Addition of Phophorus", News Release of Hitachi Maxell, Ltd., Mar. 29, 2005, http://www.maxell.co.jp/e/release/20050329.html., two pages.

M. Uchida et al., J. Electrochem. Soc. vol. 143, No. 7, Jul. 1996, pp. 2245-2252.

M Uchida et al., J. Electrochem. Soc., vol. 142, No. 8, Aug. 1995, pp. 2572-2576.

* cited by examiner

*Primary Examiner*—Patrick Ryan
*Assistant Examiner*—Ben Lewis
(74) *Attorney, Agent, or Firm*—Birch, Stewart, Kolasch & Birch, LLP

(57) ABSTRACT

A fuel cell includes a fuel electrode, an oxygen electrode, and a polymer electrolyte membrane placed between the fuel electrode and the oxygen electrode. The fuel electrode and/or the oxygen electrode include a catalyst composed of a particle containing at least Pt and P and a carbon support.

12 Claims, 4 Drawing Sheets

FUEL CELL, MEMBRANE ELECTRODE ASSEMBLY, CATALYST USED THEREFOR, AND METHOD OF PRODUCING CATALYST

BACKGROUND OF THE INVENTION

1. Field of the Invention

The present invention relates to fuel cells and membrane electrode assemblies. More specifically, the present invention relates to a fuel cell and a membrane electrode assembly where a new Pt catalyst that is supported on a carbon carrier is an oxygen electrode catalyst.

2. Description of Related Art

Most part of electric energy has been supplied by thermal power generation, water power generation, and nuclear electric power generation. However, the thermal power generation burns fossil fuel such as oil and coal and it causes not only extensive environmental pollution but also depletion of energy source such as oil. The water power generation requires large-scale dam construction and it causes destruction of nature and has a problem of a limited proper construction site. Further, the nuclear electric power generation has problems that radioactive contamination in the event of accident is fatal and decommissioning of nuclear reactor facility is difficult, and the nuclear reactor construction is decreasing on a global basis.

As a power generation system which does not require large-scale facilities nor causes environmental pollution, wind power generation and solar photovoltaic power generation come into use around the world. Our country also puts the wind power generation and the solar photovoltaic power generation to practical use in some places. However, the wind power generation cannot generate power with no wind and the solar photovoltaic power generation cannot generate power with no sunlight. The two systems are dependent on natural phenomena and thus incapable of stable power supply. Further, the wind power generation has a problem that the frequency of generated power varies by the intensity of wind, causing breakdown of electrical equipment.

Recently, a power plant that draws electric energy out of hydrogen energy, such as hydrogen fuel cells, has been under active development. The hydrogen is obtained by splitting water and exists inexhaustibly on the earth. In addition, the hydrogen has a large chemical energy amount per unit mass, and it does not generate hazardous substance and global warming gas when used as an energy source.

A fuel cell which uses methanol instead of hydrogen has also been studied actively. A direct methanol fuel cell that directly uses methanol, which is a liquid fuel, is easy to use and costs less. Thus, the direct methanol fuel cell is expected to be used as a relatively small output power source for household or industrial use. A theoretical output voltage of a methanol/oxygen fuel cell is 1.2 V (25° C.), which is almost the same as that of the hydrogen fuel cell. Thus, they have the same characteristics in principle.

A polymer electrolyte fuel cell and a direct methanol fuel cell oxidize hydrogen or methanol at the anode and reduce oxygen at the cathode, thereby drawing electric energy. Since oxidation-reduction reaction hardly occurs at room temperature, a catalyst is used in the fuel cells. Initial fuel cells use platinum (Pt) as a catalyst, depositing it on a carbon support. The Pt has catalytic activity for oxidation of hydrogen and methanol. A conventional approach for minimizing Pt catalyst particles to increase a reactive surface area is to control the deposition atmosphere of the Pt catalyst by adjusting external factors in the deposition process. For example, Japanese Unexamined Patent Application Publication No. 56-155645 introduces a technique that, when reducing Pt ion by adding alcohol and depositing it on a carbon support, adds polyvinyl alcohol into a reaction solvent. The polyvinyl alcohol serves as a protective colloid, which absorbs weakly onto the surface of the Pt catalyst particles, thereby forming fine Pt catalyst particles. However, since the protective colloid absorbs onto the surface of the Pt catalyst in this technique, it is necessary to remove the protective colloid from the Pt catalyst surface after catalyst synthesis in order to enhance the catalytic activity. Japanese Unexamined Patent Application Publication No. 56-155645 describes a technique that performs heat treatment at 400° C. in steam flow after catalyst synthesis so as to remove the protective colloid. This processing technique, however, cannot completely remove the protective colloid from the Pt catalyst surface; further, the heat treatment at 400° C. causes sintering of the Pt catalyst particles to increase the catalyst particle size, thereby decreasing the catalytic activity.

If Pt catalyst is synthesized by impregnation, electroless plating (metal plating), or alcohol reduction, the particle diameter is about 2 to 10 nm; thus, the particle diameter distribution is wide and a large number of catalyst particles with a particle diameter of 5 nm or larger exist. Generally, the catalyst activity increases as a surface area per unit weight, which is a specific surface area, increases. If the particle diameter of Pt catalyst is large, the specific surface area is small and catalytic activity is low. Thus, in order to enhance the activity of the Pt catalyst, it is very important to reduce the particle diameter of Pt catalyst to smaller than 5 nm and increase the catalyst specific surface area. In this case, a technique that adds protective colloid to reduce a Pt catalyst particle diameter cannot be used for the above reasons.

Generally, synthesizing Pt catalyst by using a carbon support with a large specific surface area causes the particle diameter of the Pt catalyst to decrease, thus producing Pt catalyst with a large specific surface area, as described in M. Uchida et al., J. Electrochem. Soc. 143, 2245 (1996), for example. This is the same for PtRu catalyst, as described in M. Uchida et al., J. Electrochem. Soc. 142, 2572 (1995), for example. However, the carbon support with a large specific surface area is porous, having an extremely large number of fine pores. Catalyst particles deposited in the fine pores are less involved in oxidation reaction of methanol or hydrogen gas. Therefore, use of a porous carbon support is at odds with the objective that increases the utilization efficiency of expensive PtRu catalyst so as to enhance battery cell characteristics with the smallest amount of catalyst. Thus, though the use of a porous carbon support with a large specific surface area allows synthesizing Pt or PtRu catalyst with a particle diameter of smaller than 5 nm, it has an adverse effect in terms of improvement in utilization efficiency of catalyst. As described above, a trade-off exists between activity improvement and catalyst utilization efficiency improvement by a decrease in catalyst particle diameter due to use of a porous carbon support with a large specific surface area.

On the other hand, use of a non-porous carbon support such as acetylene black and multiwalled carbon nanotube significantly increases catalyst utilization efficiency because all Pt or PtRu catalyst particles are deposited on the support surface. However, since the non-porous carbon support has no pore, its specific surface are is as small as 20 to 140 $m^2/g$. For example, the specific surface area of non-porous multiwalled carbon nanotube is about 20 to 35 $m^2/g$ and the specific surface area of non-porous acetylene black is about 60 to 140 $m^2/g$. The specific surface area of these non-porous carbon supports is smaller by one to two digits than that of Ketjenblack 600 JD that is a porous carbon support, which is 1270 m²/g. Synthesizing Pt or PtRu catalyst by using a carbon support with a small specific surface area causes a particle diameter to increase as described in M. Uchida et al., J. Electrochem. Soc. 143, 2245 (1996) and M. Uchida et al., J. Electrochem. Soc. 142, 2572 (1995) mentioned above. Thus, use of a non-porous carbon support with a small specific surface area results in a larger particle diameter of Pt or PtRu-catalyst. The specific surface area of the Pt or PtRu catalyst thereby decreases to reduce catalyst activity. Therefore, a trade-off that is similar to the case of using a porous carbon support with a large specific surface area also exists in the case of using a non-porous carbon support with a small specific surface area.

SUMMARY OF THE INVENTION

In view of the foregoing, it is an object of the present invention to provide a fuel cell and a membrane electrode assembly that uses a non-porous carbon support with a small specific surface area so as to increase utilization efficiency of catalyst particles while keeping a catalyst particle diameter to less than 5 nm so as to uses a highly Pt active catalyst at an oxygen electrode catalyst.

To these ends, according to a first aspect of the present invention, there is provided a fuel cell that includes a fuel electrode, an oxygen electrode, and a polymer electrolyte membrane placed between the fuel electrode and the oxygen electrode, wherein the oxygen electrode includes catalyst composed of a particle containing at least Pt and P and a carbon support.

In a second aspect, a content of P in the catalyst in the first aspect is 2 atomic % to 50 atomic %.

In a third aspect, a particle diameter of the catalyst in the first aspect is less than 5 nm.

In a fourth aspect, the particle diameter of the catalyst in the third aspect is 1 nm to 3 nm.

In a fifth aspect, the carbon support in the first aspect has a specific surface area of 300 m²/g and smaller.

In a sixth aspect, the carbon support in the fifth aspect has a specific surface area of 20 m²/g to 140 m²/g.

In a seventh aspect, the carbon support in the sixth aspect is one selected from non-porous acetylene black and multiwalled carbon nanotube.

In an eighth aspect, catalyst used for the fuel electrode in the first aspect is PtRuP catalyst.

According to a ninth aspect of the present invention, there is provided a membrane electrode assembly that includes a fuel electrode catalyst layer, an oxygen electrode catalyst layer, and a polymer electrolyte membrane placed between the fuel electrode catalyst layer and the oxygen electrode catalyst layer, wherein the oxygen electrode catalyst layer includes catalyst composed of a particle containing at least Pt and P and a carbon support.

According to a tenth aspect of the present invention, there is provided catalyst for a fuel cell oxygen electrode used for an oxygen electrode of the fuel cell in the first aspect, that includes a particle containing at least Pt and P and a carbon support.

According to an eleventh aspect of the present invention, there is provided a method of producing the catalyst for a fuel cell oxygen electrode in the tenth aspect, that includes reducing Pt ion with a reducing agent containing phosphorus.

In a twelfth aspect, the reducing in the eleventh aspect is performed by one selected from alcohol reduction, electroless plating and ultrasonic reduction.

The present invention have found that adding P to produce Pt—P catalyst when depositing Pt catalyst on a carbon support by electroless plating, alcohol reduction, or ultrasonic reduction miniaturizes Pt catalyst particles that are deposited on the carbon support by the action of P from the inside and outside of the Pt catalyst particles, which increases the specific surface area of the catalyst particles, thereby improving catalytic activity.

As described earlier, conventional techniques have a problem of trade-off that use of a non-porous carbon support with a small specific surface area such as multiwalled carbon nanotube and acetylene black advantageously enhances catalyst use efficiency but disadvantageously increases the particle size of Pt catalyst to result in a decrease in catalyst activity. The present invention can reduce the particle diameter by adding P to produce PtP catalyst, thereby solving the problem of trade-off due to use of the non-porous carbon support with a small specific surface area.

Generally, Nafion® membrane, available from E.I. DuPont de Namours and Company, is used as a polymer electrolyte membrane between a fuel electrode catalyst layer and an oxidation electrode catalyst layer of a fuel cell. The Nafion® membrane is perfluorosulfonic acid, and a hydrogen atom of a sulfonic group is easily split off as $H^+$ due to high electronegativity of fluorine, showing high proton conductivity. High proton conductivity means that the Nafion® membrane has high acidity. Therefore, the boundary between the Nafion® membrane and an electrode catalyst layer and the boundary between catalyst particles pasted with Nafion® resin and Nafion® are strongly acidic. A conventional technique to enhance the activity of Pt catalyst is to add transition metal element such as Mo, Mn, Fe, and Co. However, these transition metals do not have sufficient acid resistance. Therefore, if the Pt catalyst including these transition metal elements contacts strongly acidic Nafion® resin, the transition metals are dissolved as ion. After ion exchange of the dissolved transition metal ion with $H^+$ in the Nafion® membrane, the proton conductivity of Nafion® decreases to deteriorate battery cell characteristics. However, since P is acid resistant unlike conventional transition metal elements, dissolution to acids hardly occurs, thus being suitable for use as an additive element to a catalyst for a fuel cell.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Oxygen electrode catalyst for a fuel cell of the present invention is composed of catalyst that is represented by the general formula PtP, which is deposited on a carbon support. In this formula, a content of P is 2 at. % to 50 at. %. If the content of P is less than 2 at. %, the particle diameter of Pt catalyst is not sufficiently small and the specific surface area of the catalyst is not large enough, thus failing to enhance catalyst activity to a sufficient degree. If, on the other hand, the content of P is more than 50 at. %, the content of Pt is too small and the catalyst activity decreases to reduce battery output.

Figure 1:
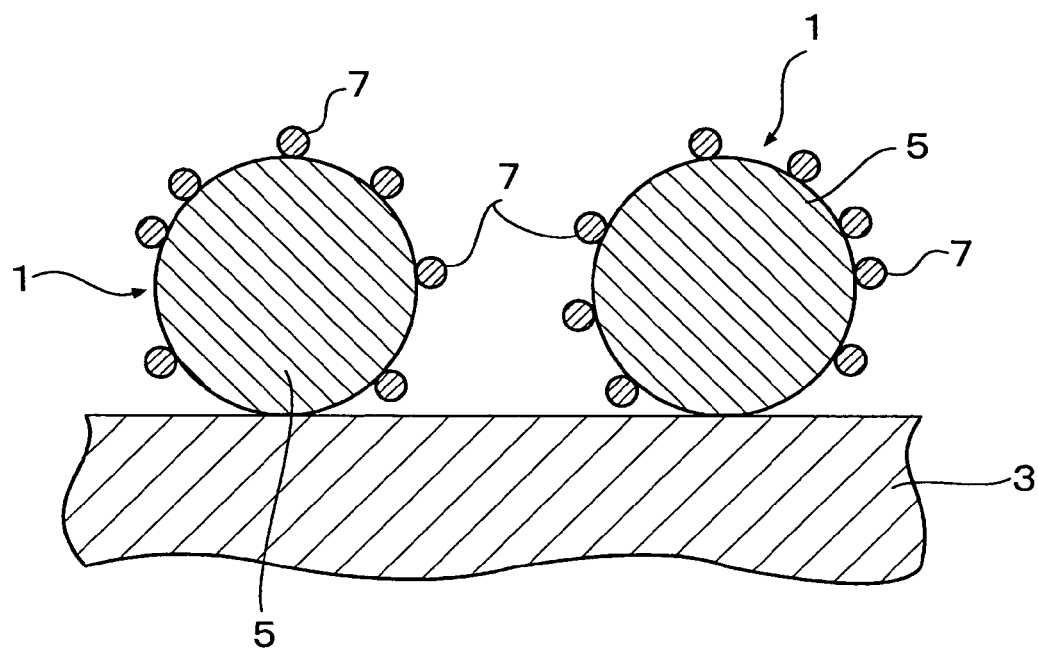
FIG. 1 is a schematic sectional view of a PtP catalyst particle according to the present invention.
Figure 2:
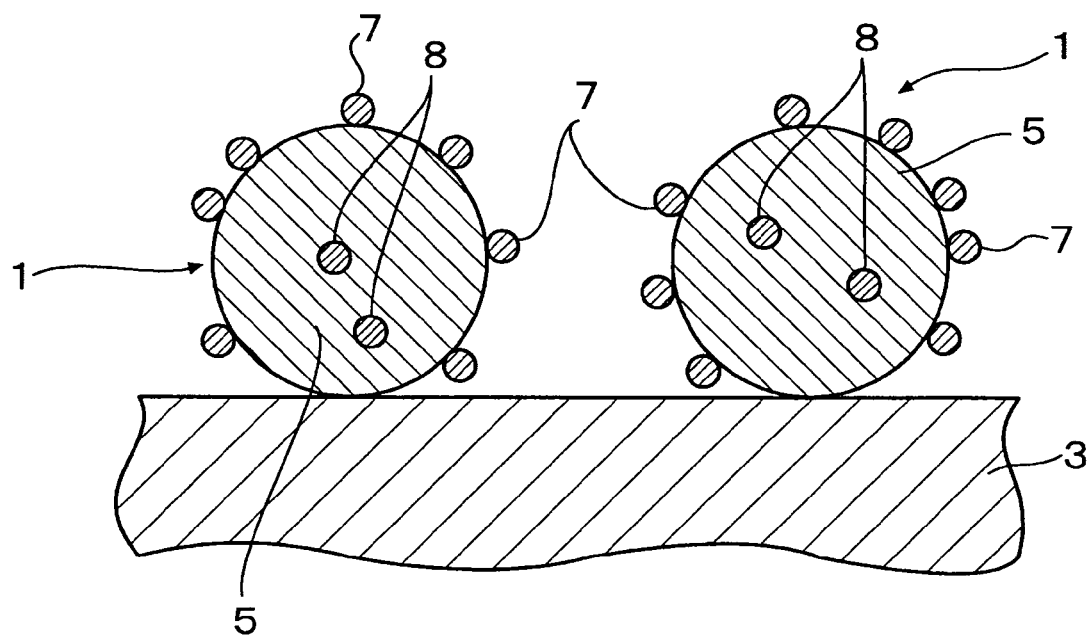
FIG. 2 is a schematic sectional view of a PtP catalyst particle according to the present invention.

FIGS. 1 and 2 are schematic sectional views of a PtP catalyst particle 1 that is obtained in the present invention. X-ray Photoelectron Spectroscopy (XPS) indicates that the PtP catalyst particle that is synthesized by alcohol reduction has P 7 existing as oxide on the outer surface of a Pt particle 5 supported on a carbon support 3 as shown in FIG. 1, and the PtP catalyst that is synthesized by electroless plating has P 7 existing as oxide on the outer surface of the Pt particle 5 and P 8 existing as metal phosphide inside the Pt particle 5 as shown in FIG. 2. Therefore, the P 7 and P 8 act from the outside or inside of the Pt particle 5 so as to suppress growth of the particle, thereby minimizing the overall size of the PtP catalyst particle 1.

The particle size of the PtP catalyst of the present invention is less than 5 nm. A preferable range is 1 to 5 nm. If the particle size is less than 1 nm, the activity on a synthesized catalyst surface is too high, and the catalyst forms a chemical compound on its surface layer together with a substance existing in the vicinity, thus decreasing its own activity. If, on the other hand, the particle size is more than 5 nm, it fails to sufficiently increase the specific surface area of the catalyst, thus unable to enhance the catalytic activity. More preferably, the particle size of the PtP catalyst of the present invention is 1 to 3 nm.

It is preferred to use non-porous acetylene black or multiwalled carbon nanotube for a support of PtP catalyst for oxygen electrode. Since no pore exists in these non-porous carbon supports, all catalyst particles are deposited on the surface of the carbon supports. This allows all catalyst to contribute to the reduction reaction of oxygen gas. It is thereby possible to increase catalyst utilization efficiency, thus improving battery cell characteristics. Further, incomparison with a case of using a conventional porous carbon support by using catalyst of the same loading rate, the catalyst of the present invention has higher catalyst utilization efficiency to improve battery cell characteristics. It is thereby possible to obtain the equal or higher battery cell characteristics than the conventional case with a smaller amount of catalyst, thus saving use Pt. Particularly, the multiwalled carbon nanotube support is rod-shaped, having a higher bulk than spherical-shaped carbon black, which has been used conventionally. Therefore, if the catalyst supported on the multiwalled carbon nanotube is pasted with Nafion® resin and formed into electrode catalyst layer by a pressing machine, a large number of physical voids exist in the electrode catalyst layer compared with a catalyst supported by a conventional carbon black. This assures the diffusion of oxygen gas into the PtP catalyst. This also enhances the diffusion of water that is generated in the oxygen electrode, thereby improving the battery cell characteristics. Further, use of the multiwalled carbon nanotube as a support of catalyst results in a lower specific resistance than use of a carbon black that is conventionally employed. This reduces IR loss, thereby suppressing a decrease in cell voltage.

A specific surface area of a non-porous carbon support to support the PtP catalyst of the present invention is preferably 300 $m^2$/g or smaller. If the specific surface area of the carbon support exceeds 300 $m^2$/g, fine pores existing in the support increase and the percentage of catalyst that is buried in the fine pores increases to lower catalyst utilization efficiency, thereby decreasing cell characteristics. More preferably, the specific surface area is 20 $m^2$/g to 140 $m^2$/g. If the specific surface area is smaller than 20 $m^2$/g, it fails to support the catalyst sufficiently, thus unable to synthesize the catalyst with a loading rate of 30 wt. % or above. If, on the other hand, the carbon support has a specific surface area of larger than 140 $m^2$/g, fine pores exist in the support. In such a support, synthesized catalyst particles are deposited inside the fine pores to reduce the percentage that contributes to reduction reaction of oxygen gas, thereby decreasing catalyst utilization efficiency. It is thereby not preferred to use a carbon support whose specific surface area is larger than 140 $m^2$/g in order to increase catalyst utilization efficiency and improve cell characteristics. However, when synthesizing catalyst with a particle diameter of 2 nm and having a high support rate of 75 wt. % or above, it is neckwear to use a carbon support with a specific surface area of larger than 140 $m^2$/g. Still, the specific surface area of the carbon support is preferably 300 $m^2$/g or smaller. For example, Vulcan®-P with a specific surface area of 140 $m^2$/g and Vulcan®-XC-72R with a specific surface of 254 $m^2$/g, which are both available from Cabot Corporation Inc., may be used.

The multiwalled carbon nanotube is a notable material as a non-porous carbon support. The shape of the multiwalled carbon nanotube is rod-like, which is completely different from a grain-shape of a conventional carbon black. It thus has a high bulk, and SEM observation shows that if a paste is made with proton conductive polymer and an electrode catalyst layer is formed by press molding, a large number of physical voids exist in the coating. This increases the diffusion of oxygen gas into a cathode catalyst layer to improve cell characteristics. This also enhances the diffusion of water that is generated in the cathode, thereby further improving the cell characteristics. Furthermore, the multiwalled carbon nanotube has a lower specific resistance than a conventionally used carbon black. This reduces IR loss, thereby suppressing a decrease in cell voltage.

The PtP catalyst of the present invention can keep its particle diameter less than 5 nm without depending on the specific surface area of a carbon support. As described earlier, conventional techniques have a problem that synthesizing Pt catalyst by using a carbon support with a small specific surface area to enhance catalyst utilization efficiency results in a larger catalyst particle diameter and thus a smaller catalyst specific surface area, thus unable to enhance catalyst activity. The PtP catalyst produced in the present invention has a particle diameter of as small as 5 nm or less or preferably as small as 1 to 3 nm even when using a carbon support with a small specific surface area. Therefore, the PtP catalyst of the present invention is a catalyst material that achieves both high catalyst utilization efficiency and high catalyst activity at the same time.

A method of producing the PtP catalyst of this invention by alcohol reduction basically includes: (1) a step of dispersing a carbon support having a specific surface area of 20 $m^2$/g to 300 $m^2$/g into one or more kinds of alcohol or alcohol solution, (2) a step of dissolving Pt salt or complex and P-containing compound into the alcohol or alcohol solution containing the dispersed carbon support, (3) a step of adjusting the pH value of the alcohol solution containing the carbon support, the Pt salt or complex and the P-containing compound to the acid side, and (4) a step of performing heat reflux with alcohol in inert atmosphere. This process produces oxygen electrode catalyst for fuel cell where catalyst that is represented by the general formula PtP is supported on the carbon support.

A method of producing the PtP catalyst of this invention by electroless plating basically includes: (1) a step of dispersing a carbon support having a specific surface area of 20 $m^2/g$ to 300 $m^2/g$ into pure water, (2) a step of dissolving Pt salt or complex and P-containing compound into the solution containing the dispersed carbon support, (3) a step of adjusting the pH value of the solution containing the dispersed carbon support, the Pt salt or complex and the P-containing compound to the alkali side, and (4) a step of performing electroless plating by rising the temperature of the solution in the air or inert atmosphere. This process produces oxygen electrode catalyst for fuel cell where catalyst that is represented by the general formula PtP is supported on the carbon support.

A method of producing the PtP catalyst of this invention by ultrasonic reduction basically includes: (1) a step of dispersing a carbon support having a specific surface area of 20 $m^2/g$ to 300 $m^2/g$ into pure water, (2) a step of dissolving Pt salt or complex and P-containing compound into the solution containing the dispersed carbon support, (3) a step of adjusting the pH value of the solution containing the dispersed carbon support, the Pt salt or complex and the P-containing compound to the alkali side, and (4) a step of applying ultrasonic wave to the solution in the air or inert atmosphere. This process produces oxygen electrode catalyst for fuel cell where catalyst that is represented by the general formula PtP is supported on the carbon support.

The particle diameter of the PtP catalyst generated by the method of the present invention is smaller than the particle diameter of conventional Pt catalyst due to the presence of P. Though the particle diameter of the Pt catalyst generated by a conventional process is generally up to 10 nm, the particle diameter of the PtP catalyst of this invention is as small as less than about 5 nm, preferably 1 to 3 nm and more preferably about 2 nm. The decrease in particle diameter increases the specific surface area of the catalyst, which significantly enhances oxygen reduction activity. Another advantage of adding P in the present invention is that the distribution range of the particle diameter is narrower than that of conventional Pt catalyst. Though the particle diameter distribution range of the Pt catalyst produced by the conventional process is as large as 2 to 10 nm, the particle diameter distribution range of the PtP catalyst of the present invention is narrowed to 1 to 3 nm.

Acid used for adjusting the pH value of synthesis solution to the acid side is preferably sulfuric acid having a boiling point of higher than 200° C. Since the alcohol reduction needs to perform heat refluxing at about 200° C. in some cases, the acid whose boiling point is less than 200° C. can be evaporated by the alcohol heat refluxing. This makes it difficult to maintain the pH value in synthetic system within a predetermined range. Therefore, hydrochloric acid and nitric acid, for example, are not suitable since they have a low boiling point and thus are evaporated during the heat refluxing. For the same reason, NaOH or KOH is suitable for adjusting the pH value of synthesis solution to the alkali side.

The P-containing compound available in the method of producing PtP catalyst according to the present invention includes phosphorous acid, phosphate (including both normal salt and acid salt), hypophosphorous acid, hypophosphite. Preferred salt is alkali metal salt such as sodium phosphite, sodium hydrogen phosphite and sodium hypophosphite, or ammonium salt such as ammonium phosphite, ammonium hydrogen phosphite and ammonium hypophosphite. Since a pentavalent P-atom has the same electron configuration as Ne, it is chemically stable by the Octet Rule and does not serve as P supply source, thus not suitable for this invention. Therefore, phosphoric acid and phosphate having pentavalent P-atom cannot be used in this invention. The adding amount of P-containing compound is preferably within the range of 5 to 700% of the number of Pt moles. If it is less than 5%, the content of P is less than 2at. % and the effect of minimizing a catalyst particle is not sufficient. If, on the other hand, it is more than 700%, the content of P is higher than 50at. % and the Pt component decreases to deteriorate catalyst activity.

Pt salt or complex used in this invention is, for example, platinum dinitrodiamine complex, triphenylphosphine platinum complex, bis(acetylacetonato)platinum(II), platinic hexachloride, potassium tetrachloroplatinate(II) and so on. The platinum compound may be used independently or in combination.

In alcohol reduction, when compound for catalyst synthesis is dissolved into alcohol solution and reduced at a temperature close to a boiling point of the alcohol solution, alcohol (R—OH) discharges electrons during heat refluxing to reduce Pt ion. The alcohol itself is oxidized into aldehyde (R—CHO). In electroless plating, when hypophosphite ion is oxidized into phosphorous ion or phosphate ion for example, it discharges electrons and Pt ion receives the electron and is reduced to metal. In ultrasonic reduction, cavitation creates a high pressure and high temperature field to generate reducing chemical species, which reduces Pt ion.

Alcohol that may be used in the heat refluxing process of the present invention includes methyl alcohol, ethyl alcohol, n-propyl alcohol, isopropyl alcohol, n-butyl alcohol, isobutyl alcohol, sec-butyl alcohol, ethylene glycol, glycerol, tetraethylene glycol, propylene glycol, isoamyl alcohol, n-amyl alcohol, allylalcohol, 2-ethoxyalcohol, 1,2-hexadecanediol. One kind or two or more kinds of the alcohol may be selected for use. In order to prevent oxidation of particles during reflux, it is preferred to perform reflux while displacing the gas in the reaction system with nitrogen or inert gas such as argon.

A heat temperature and a reflux time in the alcohol reduction process vary by the kind of alcohol in use. Generally, the heat temperature is about 60° C. to 300° C., and the reflux time is about 30 minutes to 6 hours. In the electroless plating process, a general bath temperature is about 50° C. to 90° C., and a plating time is about 30 minutes to 2 hours. In the ultrasonic reduction process, an ultrasonic wave application time is about 30 minutes to 4 hours.

In the present invention, the alcohol reduction process dissolves Pt salt or complex and P-containing compound into at least one kind of alcohol. The alcohol may or may not contain water. The electroless plating process and the ultrasonic reduction process dissolve Pt salt or complex and P-containing compound into pure water basically. The electroless plating process and the ultrasonic reduction process may add the above-described alcohol as reduction assistant.

A loading rate of the catalyst used in this invention is suitably 30 wt % or above. If it is less than 30 wt %, formation of a given amount of catalyst results in an increase in the thickness of a catalyst electrode. This increases diffusive resistance of oxygen fuel or generated water, which is not suitable. An upper limit of a loading rate is not specified. For example, in order to obtain a loading rate of 80 wt %, a specific surface area of a support needs to be 200 $m^2/g$ or larger if a catalyst particle diameter is 2 nm. Obtaining catalyst with a high loading rate requires use of a porous carbon support. In such a case as well, it is needed to use a porous carbon support with the smallest possible number of fine pores. For example, Vulcan®-XC-72R with a specific surface of 254 m$^2$/g available from Cabot corporation Inc. may be used.

Though fuel electrode catalyst to be used in pair with the PtP oxygen electrode catalyst of the present invention may be the one that is used conventionally in direct methanol fuel cells and polymer electrolyte fuel cells, such as PtRu, it is preferred to use a PtRuP catalyst particle that is described in Japanese Patent Application No. 2003-433758, 2004-206232, 2004-271034 and 2004-373450, which are presented by the inventors of the present invention. As described in these, the inventors have already found that adding P reduces a particle diameter of PtRu catalyst. By adding P, the PtRu catalyst particle diameter is reduced to less than about 5 nm, preferably 1 to 3 nm, and more preferably about 2 nm. This increases the specific surface area of PtRuP catalyst, thereby enhancing the oxidation activity of methanol or hydrogen. Even when non-porous multiwalled carbon nanotube or acetylene black is used as a carbon support, the particle diameter of the PtRuP catalyst is kept to less than 5 nm. Thus, using the PtP oxygen electrode catalyst in combination with the PtRuP fuel electrode catalyst allows producing a fuel cell with significantly high cell characteristics.

EXAMPLE 1

Bis(acetylacetonato)platinum(II) of 1.69 mmol and sodium hypophosphite of 0.845 mmol were dissolved into ethylene glycol of 200 ml and added to an ethylene glycol solution of 200 ml that contains dispersed multiwalled carbon nanotube (MWCNT) with a specific surface area of 30 m$^2$/g of 0.5 g as a non-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the multiwalled carbon nanotube. After the reaction ends, filtration, washing, and drying were performed, thereby producing catalyst.

EXAMPLE 2

Bis(acetylacetonato)platinum(II) of 1.69 mmol and sodium hypophosphite of 0.845 mmol were dissolved into ethylene glycol of 200 ml and added to an ethylene glycol solution of 200 ml that contains dispersed acetylene black (AB) with a specific surface area of 68 m$^2$/g of 0.5 g as a non-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the acetylene black. After the reaction ends, filtration, washing, and drying were performed, thereby producing catalyst.

EXAMPLE 3

Bis(acetylacetonato)platinum(II) of 1.69 mmol and sodium hypophosphite of 0.845 mmol were dissolved into ethylene glycol of 200 ml and added to an ethylene glycol solution of 200 ml that contains dispersed carbon black (CB) with a specific surface area of 140 m$^2$/g of 0.5 g as a porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the carbon black. After the reaction ends, filtration, washing, and drying were performed, thereby producing catalyst.

EXAMPLE 4

Bis(acetylacetonato)platinum(II) of 1.69 mmol and sodium phosphite of 0.845 mmol were dissolved into ethylene glycol of 200 ml and added to an ethylene glycol solution of 130 ml that contains dispersed multiwalled carbon nanotube (MWCNT) with a specific surface area of 30 m$^2$/g of 0.5 g as a non-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the multiwalled carbon nanotube. After the reaction ends, filtration, washing, and drying were performed, thereby producing catalyst.

EXAMPLE 5

Bis(acetylacetonato)platinum(II) of 1.69 mmol and sodium phosphite of 0.845 mmol were dissolved into ethylene glycol of 200 ml and added to an ethylene glycol solution of 130 ml that contains dispersed acetylene black (AB) with a specific surface area of 68 m$^2$/g of 0.5 g as a non-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the acetylene black. After the reaction ends, filtration, washing, and drying were performed, thereby producing catalyst.

EXAMPLE 6

Bis(acetylacetonato)platinum(II) of 1.69 mmol and sodium phosphite of 0.845 mmol were dissolved into ethylene glycol of 200 ml and added to an ethylene glycol solution of 130 ml that contains dispersed carbon black (CB) with a specific surface area of 140 m$^2$/g of 0.5 g as a porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit PtP catalyst on the carbon black. After the reaction ends, filtration, washing, and drying were performed, thereby producing catalyst.

EXAMPLE 7

Multiwalled carbon nanotube (MWCNT), which is a non-porous support, with a specific surface area of 30 m$^2$/g of 0.5 g was dispersed into pure water. Platinic hexachloride of hexahydrate of 1.69 mmol and sodium hypophosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the multiwalled carbon nanotube. After the reaction ends, filtration, washing, and drying were performed, thereby producing catalyst.

EXAMPLE 8

Acetylene black (AB), which is a non-porous support, with a specific surface area of 68 m$^2$/g of 0.5 g was dispersed into pure water. Platinic hexachloride of hexahydrate of 1.69 mmol and sodium hypophosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the acetylene black. After the reaction ends, filtration, washing, and drying were performed, thereby producing catalyst.

EXAMPLE 9

Carbon black (CB), which is a porous support, with a specific surface area of 140 $m^2/g$ of 0.5 g was dispersed into pure water. Platinic hexachloride of hexahydrate of 1.69 mmol and sodium hypophosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the carbon black. After the reaction ends, filtration, washing, and drying were performed, thereby producing catalyst.

EXAMPLE 10

Multiwalled carbon nanotube (MWCNT), which is a non-porous support, with a specific surface area of 30 $m^2/g$ of 0.5 g was dispersed into pure water. Platinic hexachloride of hexahydrate of 1.69 mmol and sodium phosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the multiwalled carbon nanotube. After the reaction ends, filtration, washing, and drying were performed, thereby producing catalyst.

EXAMPLE 11

Acetylene black (AB), which is a non-porous support, with a specific surface area of 68 $m^2/g$ of 0.5 g was dispersed into pure water. Platinic hexachloride of hexahydrate of 1.69 mmol and sodium phosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the acetylene black. After the reaction ends, filtration, washing, and drying were performed, thereby producing catalyst.

EXAMPLE 12

Carbon black (CB), which is a porous support, with a specific surface area of 140 $m^2/g$ of 0.5 g was dispersed into pure water. Platinic hexachloride of hexahydrate of 1.69 mmol and sodium phosphite of 6.76 mmol were dissolved into pure water of 500 ml and added. Sodium hydroxide solution was dropped, and the pH value of the solution was adjusted to 12 by using a pH meter. In the air, the solution temperature was raised to 80° C. by using a hot plate while being stirred. The electroless plating was performed for 1 hour at this temperature so as to deposit PtP catalyst on the carbon black. After the reaction ends, filtration, washing, and drying were performed, thereby producing catalyst.

EXAMPLE 13

Multiwalled carbon nanotube (MWCNT), which is a non-porous support, with a specific surface area of 30 $m^2/g$ of 0.5 g was dispersed into pure water. Platinic hexachloride of hexahydrate of 1.69 mmol and sodium hypophosphite of 0.845 mmol were dissolved into pure water of 500 ml and added. Sodium hydroxide solution was dropped, and the pH value of the solution was adjusted to 10 by using a pH meter. In the air, ultrasonic wave was applied to the solution for 2 hours by using a commercially available ultrasonic cleaner so as to deposit PtP catalyst on the multiwalled carbon nanotube. After the reaction ends, filtration, washing, and drying were performed, thereby producing catalyst.

EXAMPLE 14

Acetylene black (AB), which is a non-porous support, with a specific surface area of 68 $m^2/g$ of 0.5 g was dispersed into pure water. Platinic hexachloride of hexahydrate of 1.69 mmol and sodium hypophosphite of 0.845 mmol were dissolved into pure water of 500 ml and added. Sodium hydroxide solution was dropped, and the pH value of the solution was adjusted to 10 by using a pH meter. In the air, ultrasonic wave was applied to the solution for 2 hours by using a commercially available ultrasonic cleaner so as to deposit PtP catalyst on the acetylene black. After the reaction ends, filtration, washing, and drying were performed, thereby producing catalyst.

EXAMPLE 15

Carbon black (CB), which is a porous support, with a specific surface area of 140 $m^2/g$ of 0.5 g was dispersed into pure water. Platinic hexachloride of hexahydrate of 1.69 mmol and sodium hypophosphite of 0.845 mmol were dissolved into pure water of 500 ml and added. Sodium hydroxide solution was dropped, and the pH value of the solution was adjusted to 10 by using a pH meter. In the air, ultrasonic wave is applied to the solution for 2 hours by using a commercially available ultrasonic cleaner so as to deposit PtP catalyst on the carbon black. After the reaction ends, filtration, washing, and drying were performed, thereby producing catalyst.

EXAMPLE 16

Multiwalled carbon nanotube (MWCNT), which is a non-porous support, with a specific surface area of 30 $m^2/g$ of 0.5 g was dispersed into pure water. Platinic hexachloride of hexahydrate of 1.69 mmol and sodium phosphite of 0.845 mmol were dissolved into pure water of 500 ml and added. Sodium hydroxide solution was dropped, and the pH value of the solution was adjusted to 10 using a pH meter. In the air, ultrasonic wave was applied to the solution for 2 hours by using a commercially available ultrasonic cleaner so as to deposit PtP catalyst on the multiwalled carbon nanotube. After the reaction ends, filtration, washing, and drying were performed, thereby producing catalyst.

EXAMPLE 17

Acetylene black (AB), which is a non-porous support, with a specific surface area of 68 $m^2/g$ of 0.5 g was dispersed into pure water. Platinic hexachloride of hexahydrate of 1.69 mmol and sodium phosphite of 0.845 mmol were dissolved into pure water of 500 ml and added. Sodium hydroxide solution was dropped, and the pH value of the solution was adjusted to 10 using a pH meter. In the air, ultrasonic wave was applied to the solution for 2 hours by using a commercially available ultrasonic cleaner so as to deposit PtP catalyst on the acetylene black. After the reaction ends, filtration, washing, and drying were performed, thereby producing catalyst.

EXAMPLE 18

Carbon black (CB), which is a porous support, with a specific surface area of 140 m$^2$/g of 0.5 g was dispersed into pure water. Platinic hexachloride of hexahydrate of 1.69 mmol and sodium phosphite of 0.845 mmol were dissolved into pure water of 500 ml and added. Sodium hydroxide solution was dropped, and the pH value of the solution was adjusted to 10 using a pH meter. In the air, ultrasonic wave is applied to the solution for 2 hours by using a commercially available ultrasonic cleaner so as to deposit PtP catalyst on the carbon black. After the reaction ends, filtration, washing, and drying were performed, thereby producing catalyst.

EXAMPLE 19

Platinic hexachloride of hexahydrate of 1.69 mmol and sodium hypophosphite of 0.845 mmol were dissolved into ethylene glycol solution of 200 ml (ethylene glycol:water=50 vol. %:50 vol. %) and added to an ethylene glycol solution of 200 ml (ethylene glycol:water=50 vol. %:50 vol. %) that contains dispersed multiwalled carbon nanotube (MWCNT) with a specific surface area of 30 m$^2$/g of 0.5 g as a non-porous support. A NaOH solution was dropped, and the pH value of the solution was adjusted to 10 by using a pH litmus paper. In a nitrogen gas atmosphere, the solution was stirred and refluxed for 4 hours at 130° C. so as to deposit PtP catalyst on the multiwalled carbon nanotube. After the reaction ends, filtration, washing, and drying were performed, thereby producing catalyst.

EXAMPLE 20

Platinic hexachloride of hexahydrate of 1.69 mmol and sodium hypophosphite of 0.845 mmol were dissolved into ethanol solution of 200 ml (ethanol:water=50 vol. %:50 vol. %) and added to an ethanol solution of 200 ml (ethanol:water=50 vol. %:50vol. %) that contains dispersed multiwalled carbon nanotube (MWCNT) with a specific surface area of 30 m$^2$/g of 0.5 g as a non-porous support. A NaOH solution was dropped, and the pH value of the solution was adjusted to 10 by using a pH litmus paper. In a nitrogen gas atmosphere, the solution was stirred and refluxed for 4 hours at 95° C. so as to deposit PtP catalyst on the multiwalled carbon nanotube. After the reaction ends, filtration, washing, and drying were performed, thereby producing catalyst.

COMPARATIVE EXAMPLE 1

Bis(acetylacetonato)platinum(II) of 1.69 mmol was dissolved into ethylene glycol of 200 ml and added to an ethylene glycol solution of 200 ml that contains dispersed multiwalled carbon nanotube (MWCNT) with a specific surface area of 30 m$^2$/g of 0.5 g as a non-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit Pt catalyst on the multiwalled carbon nanotube. After the reaction ends, filtration, washing, and drying were performed, thereby producing catalyst.

COMPARATIVE EXAMPLE 2

Bis(acetylacetonato)platinum(II) of 1.69 mmol was dissolved into ethylene glycol of 200 ml and added to an ethylene glycol solution of 200 ml that contains dispersed acetylene black (AB) with a specific surface area of 68 m$^2$/g of 0.5 gas anon-porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit Pt catalyst on the acetylene black. After the reaction ends, filtration, washing, and drying were performed, thereby producing catalyst.

COMPARATIVE EXAMPLE 3

Bis(acetylacetonato)platinum(II) of 1.69 mmol was dissolved into ethylene glycol of 200 ml and added to an ethylene glycol solution of 200 ml that contains dispersed carbon black (CB) with a specific surface area of 140 m$^2$/g of 0.5 g as a porous support. A sulfuric acid solution was dropped, and the pH value of the solution was adjusted to 3 by using a pH litmus paper. In a nitrogen gas atmosphere, the solution was stirred and refluxed for 4 hours at 200° C. so as to deposit Pt catalyst on the carbon black. After the reaction ends, filtration, washing, and drying were performed, thereby producing catalyst.

The composition of each catalyst produced in Examples 1 to 20 and Comparative Examples 1 to 3 is observed by X-ray photoelectron spectroscopy analysis (XPS). Further, the particle diameter of the catalyst is observed by transmission electron microscope (TEM). Table 1 shows the results. In examples 1 to 20, sodium hypophosphite or sodium phosphate is added in a synthetic system and therefore P is added to the Pt catalyst. The particle diameter of the PtP catalyst produced in Examples 1 to 18 decreases to 2 nm. Addition of P has the effect of reducing the particle diameter of Pt catalyst to 2 nm even in the case a non-porous carbon support with a small specific surface area is used. Use of the non-porous carbon support with a small specific surface area allows all catalyst to be deposited on the surface of the support, thus improving catalyst utilization efficiency. Thus, adding P reduces the catalyst particle diameter to 2 nm to keep high catalyst activity even when a non-porous carbon support with a small specific surface area is used. The PtP catalyst is therefore an extremely useful catalyst material that can achieve high catalyst activity and high catalyst utilization efficiency at the same time. Example 19 uses an ethylene glycol aqueous solution as alcohol and synthesizes PtP catalyst by lowering a reflux temperature from 200° C. to 130° C. The growth of a particle is suppressed by lowering the synthesis temperature. Thus, the PtP catalyst with a particle diameter of 1.8 nm is obtained by lowering the synthesis temperature to 130° C. Similarly, Example 20 uses an ethanol aqueous solution and synthesizes PtP catalyst at a reflux temperature of 95° C. As a result, the PtP catalyst with a particle diameter of 1.5 nm is obtained. On the other hand, since Comparative Examples 1 to 3 do not add P, the particle diameter of Pt catalyst is as large as 6 to 10 nm. Though the particle diameter of Pt catalyst decreases as a specific surface area of a carbon support increases, it is still as high as up to 6 nm even with a use of CB with a specific surface area of 140 m$^2$/g.

TABLE 1

| Catalyst | Carbon support | Support specific surface area (m²/g) | Catalyst particle diameter by TEM | Catalyst composition (at. %) |
|---|---|---|---|---|
| Embodiment 1 | MWCNT | 30 | 2 nm | $Pt_{86}P_{14}$ |
| Embodiment 2 | AB | 68 | 2 nm | $Pt_{86}P_{14}$ |
| Embodiment 3 | CB | 140 | 2 nm | $Pt_{86}P_{14}$ |
| Embodiment 4 | MWCNT | 30 | 2 nm | $Pt_{87}P_{13}$ |
| Embodiment 5 | AB | 68 | 2 nm | $Pt_{87}P_{13}$ |
| Embodiment 6 | CB | 140 | 2 nm | $Pt_{87}P_{13}$ |
| Embodiment 7 | MWCNT | 30 | 2 nm | $Pt_{88}P_{12}$ |
| Embodiment 8 | AB | 68 | 2 nm | $Pt_{88}P_{12}$ |
| Embodiment 9 | CB | 140 | 2 nm | $Pt_{88}P_{12}$ |
| Embodiment 10 | MWCNT | 30 | 2 nm | $Pt_{89}P_{11}$ |
| Embodiment 11 | AB | 68 | 2 nm | $Pt_{89}P_{11}$ |
| Embodiment 12 | CB | 140 | 2 nm | $Pt_{89}P_{11}$ |
| Embodiment 13 | MWCNT | 30 | 2 nm | $Pt_{86}P_{14}$ |
| Embodiment 14 | AB | 68 | 2 nm | $Pt_{86}P_{14}$ |
| Embodiment 15 | CB | 140 | 2 nm | $Pt_{86}P_{14}$ |
| Embodiment 16 | MWCNT | 30 | 2 nm | $Pt_{85}P_{15}$ |
| Embodiment 17 | AB | 68 | 2 nm | $Pt_{85}P_{15}$ |
| Embodiment 18 | CB | 140 | 2 nm | $Pt_{85}P_{15}$ |
| Embodiment 19 | MWCNT | 30 | 1.8 nm | $Pt_{86}P_{14}$ |
| Embodiment 20 | MWCNT | 30 | 1.5 nm | $Pt_{86}P_{14}$ |
| Comparative example 1 | MWCNT | 30 | to 10 nm | $Pt_{100}$ |
| Comparative example 2 | AB | 68 | to 8 nm | $Pt_{100}$ |
| Comparative example 3 | CB | 140 | to 6 nm | $Pt_{100}$ |

Figure 3A:
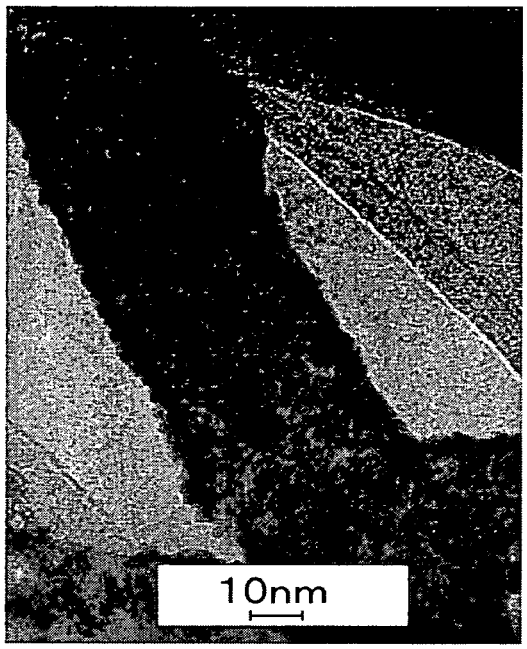
FIG. 3A is an electron microscope image of PtP catalyst supported on a multiwalled carbon nanotube obtained in an example 1.
Figure 3B:
FIG. 3B is an electron microscope image of Pt catalyst supported on a multiwalled carbon nanotube obtained in a comparative example 1.

FIG. 3A shows a transmission electron microscope image of PtP catalyst with a multiwalled carbon nanotube support that is obtained by Example 1, and FIG. 3B shows that of Pt catalyst with a multiwalled carbon nanotube support that is obtained by Comparative Example 1. As shown in the images, the PtP catalyst of this invention has a particle diameter of 2 nm and catalyst particles are dispersed sufficiently. On the other hand, the Pt catalyst of Comparative Example 1 that does not contain P has a particle diameter of as large as up to 10 nm and catalyst particles are agglutinated and not dispersed sufficiently. These results show the effects of reducing particle sizes and dispersing particles of the Pt catalyst by addition of P.

EXAMPLE 21

Figure 4:
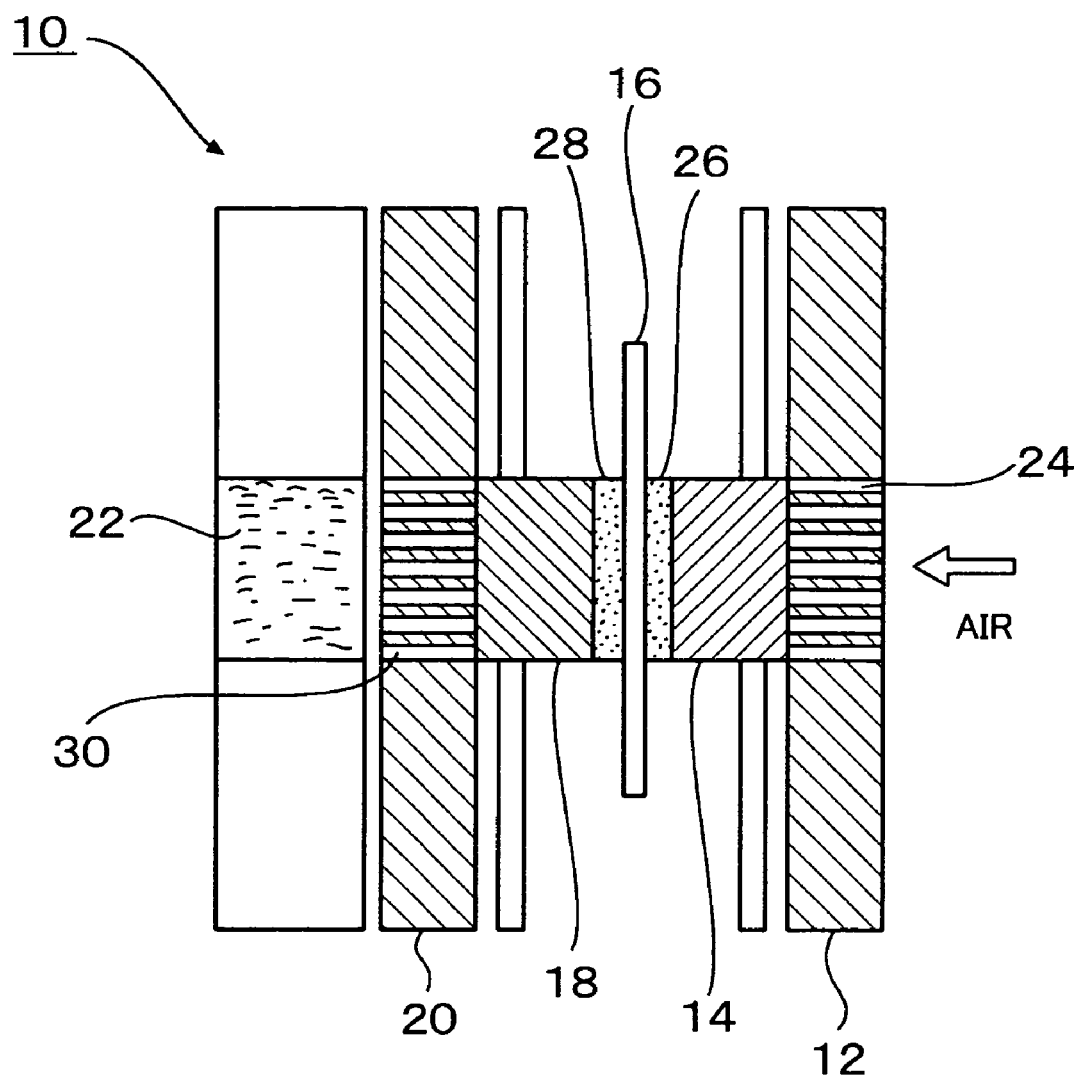
FIG. 4 is a schematic block diagram of a direct methanol fuel cell according to the present invention.

An alcohol solution of pure water and Nafion®, available from E.I. DuPont de Namours and Company, was added to the PtP catalyst with a carbon support that is obtained in Examples 1 to 20 and stirred, and then its viscosity was adjusted to create a catalyst ink. The catalyst ink was then applied onto Teflon® sheet, available also from Dupont, in such a way that the application amount of the PtP catalyst was 5 mg/cm². After dried, the Teflon® sheet was peeled off, thereby creating an oxygen electrode catalyst. Further, an alcohol solution of pure water and Nafion® was added to the PtRuP catalyst with a particle diameter of 2 nm supported on acetylene black (AB) with a specific surface area of 68 m²/g, which is a non-porous carbon support, and stirred, and then its viscosity was adjusted to create a catalyst ink. The catalyst ink was then applied onto Teflon® sheet in such a way that the amount of the Pt catalyst was 5 mg/cm². After dried, the Teflon® sheet was peeled off, thereby creating a methanol electrode catalyst. Then, the PtP oxygen electrode catalyst and the PtRuP methanol electrode catalyst were hot pressed to both sides of a polymer electrolyte membrane (Nafion® membrane 112, available from Dupont), thereby producing a membrane electrode assembly. Using the membrane electrode assembly and a methanol solution of 15 wt % as a liquid fuel, a direct-methanol fuel cell shown in FIG. 4 was produced. The direct methanol fuel cell 10 of FIG. 4 includes an oxygen electrode side charge collector 12, an oxygen electrode side diffusion layer 14, a polymer electrolyte membrane 16, a methanol electrode side diffusion layer 18, a methanol electrode side charge collector 20, a methanol fuel tank 22, an air intake opening 24, an oxygen electrode PtP catalyst layer 26, a methanol electrode PtRuP catalyst layer 28, and a methanol fuel intake opening 30. The oxygen electrode side charge collector 12 serves as a structure to take in the air (oxygen) through the air intake opening 24 and also as a power collector. The polymer electrolyte membrane 16 (Nafion® membrane 112, available from DuPont) serves as a carrier that carries proton generated in the methanol electrode to the oxygen electrode and also as a separator that prevents the short-circuit of the methanol electrode and the oxygen electrode. In the direct methanol fuel cell 10 having this configuration, liquid fuel supplied from the methanol electrode side charge collector 20 passes through the methanol electrode side diffusion layer 18 and enters the methanol electrode catalyst layer 28 where it is oxidized into $CO_2$, electron, and proton. The proton passes through the polymer electrolyte membrane 16 and moves to the oxygen electrode side. In the oxygen electrode, the oxygen entering from the oxygen electrode side charge collector 12 is reduced by the electron generated in the methanol electrode, and this oxygen and the proton react to generate water. The direct methanol fuel cell 10 of FIG. 4 generates electric power by the methanol oxidation reaction and the oxygen reduction reaction.

COMPARATIVE EXAMPLE 4

The comparative example 4 produced a direct methanol fuel cell in the same manner as Example 21 except for using the Pt catalyst of Comparative Examples 1 to 3 instead of the PtP catalyst in Example 21 as oxygen electrode catalyst.

The power density of each direct methanol fuel cell obtained in Example 21 and Comparative Example 4 was measured. Table 2 shows the measurement results. Since Example 21 used PtP catalyst, a catalyst particle diameter was 2 nm or less. Further, it used a non-porous carbon support or a carbon support that is a porous support with a relatively smaller number of fine pores as a catalyst support. Therefore, catalyst utilization efficiency increased as catalyst activity increased, and the power density was as high as 90 mW/cm² or higher. In Table 2, the power density was highest with carbon support of MWCNT, second highest with AB and lowest with CB. The CB produced the lowest power density because CB is a porous support and part of PtP catalyst was buried in the fine pores and unable to contribute to oxygen reduction reaction. Since AB is a non-porous support, it produced a higher power density than the CB support. MWCNT had a large number of physical voids in the electrode catalyst layer because of being non-porous and its shape. This enhanced dispersion of oxygen gas that served as fuel and water that was generated at cathode. Further, since MWCNT had a lower specific resistance than CB, it is possible to reduce IR loss and suppress a decrease in cell voltage, thereby producing high power density. Furthermore, Example 19 synthesized PtP catalyst by lowering a reflux temperature from 200° C. to 130° C., and Example 20 synthesized PtP catalyst by lowering a reflux temperature to 95° C. The reduction in synthesis temperature suppressed growth of catalyst particles, and the particle diameters of PtP catalyst were reduced to 1.8 nm and 1.5 nm, respectively. The decrease in particle diameter increased the specific surface area of catalyst to enhance catalyst activity, and the power density was thereby as high as 110 mW/cm$^2$ or higher. On the other hand, as shown in Comparative Example 4, when using a non-porous MWCNT as a support, the particle diameter of Pt catalyst, which does not contain P, was as large as up to 10 nm, and the power density was 70 mW/cm$^2$. Even when CB with a large specific surface area was used as a support, the particle diameter was still as large as up to 6 nm and the power density increased by only about 5 mW/cm$^2$.

TABLE 2

| Catalyst | Carbon support | Support specific surface area (m$^2$/g) | Catalyst particle diameter (nm) | Catalyst composition (at. %) | Power density (mW/cm$^2$) |
| --- | --- | --- | --- | --- | --- |
| Embodiment 1 | MWCNT | 30 | 2 | $Pt_{86}P_{14}$ | 100 |
| Embodiment 2 | AB | 68 | 2 | $Pt_{86}P_{14}$ | 95 |
| Embodiment 3 | CB | 140 | 2 | $Pt_{86}P_{14}$ | 90 |
| Embodiment 4 | MWCNT | 30 | 2 | $Pt_{87}P_{13}$ | 101 |
| Embodiment 5 | AB | 68 | 2 | $Pt_{87}P_{13}$ | 95 |
| Embodiment 6 | CB | 140 | 2 | $Pt_{87}P_{13}$ | 90 |
| Embodiment 7 | MWCNT | 30 | 2 | $Pt_{88}P_{12}$ | 102 |
| Embodiment 8 | AB | 68 | 2 | $Pt_{88}P_{12}$ | 96 |
| Embodiment 9 | CB | 140 | 2 | $Pt_{88}P_{12}$ | 90 |
| Embodiment 10 | MWCNT | 30 | 2 | $Pt_{89}P_{11}$ | 101 |
| Embodiment 11 | AB | 68 | 2 | $Pt_{89}P_{11}$ | 96 |
| Embodiment 12 | CB | 140 | 2 | $Pt_{89}P_{11}$ | 90 |
| Embodiment 13 | MWCNT | 30 | 2 | $Pt_{86}P_{14}$ | 101 |
| Embodiment 14 | AB | 68 | 2 | $Pt_{86}P_{14}$ | 94 |
| Embodiment 15 | CB | 140 | 2 | $Pt_{86}P_{14}$ | 90 |
| Embodiment 16 | MWCNT | 30 | 2 | $Pt_{85}P_{15}$ | 100 |
| Embodiment 17 | AB | 68 | 2 | $Pt_{85}P_{15}$ | 95 |
| Embodiment 18 | CB | 140 | 2 | $Pt_{85}P_{15}$ | 90 |
| Embodiment 19 | MWCNT | 30 | 1.8 | $Pt_{86}P_{14}$ | 110 |
| Embodiment 20 | MWCNT | 30 | 1.5 | $Pt_{86}P_{14}$ | 120 |
| Comparative example 1 | MWCNT | 30 | to 10 | $Pt_{100}$ | 70 |
| Comparative example 2 | AB | 68 | to 8 | $Pt_{100}$ | 73 |
| Comparative example 3 | CB | 140 | to 6 | $Pt_{100}$ | 75 |

EXAMPLE 22

Figure 5:
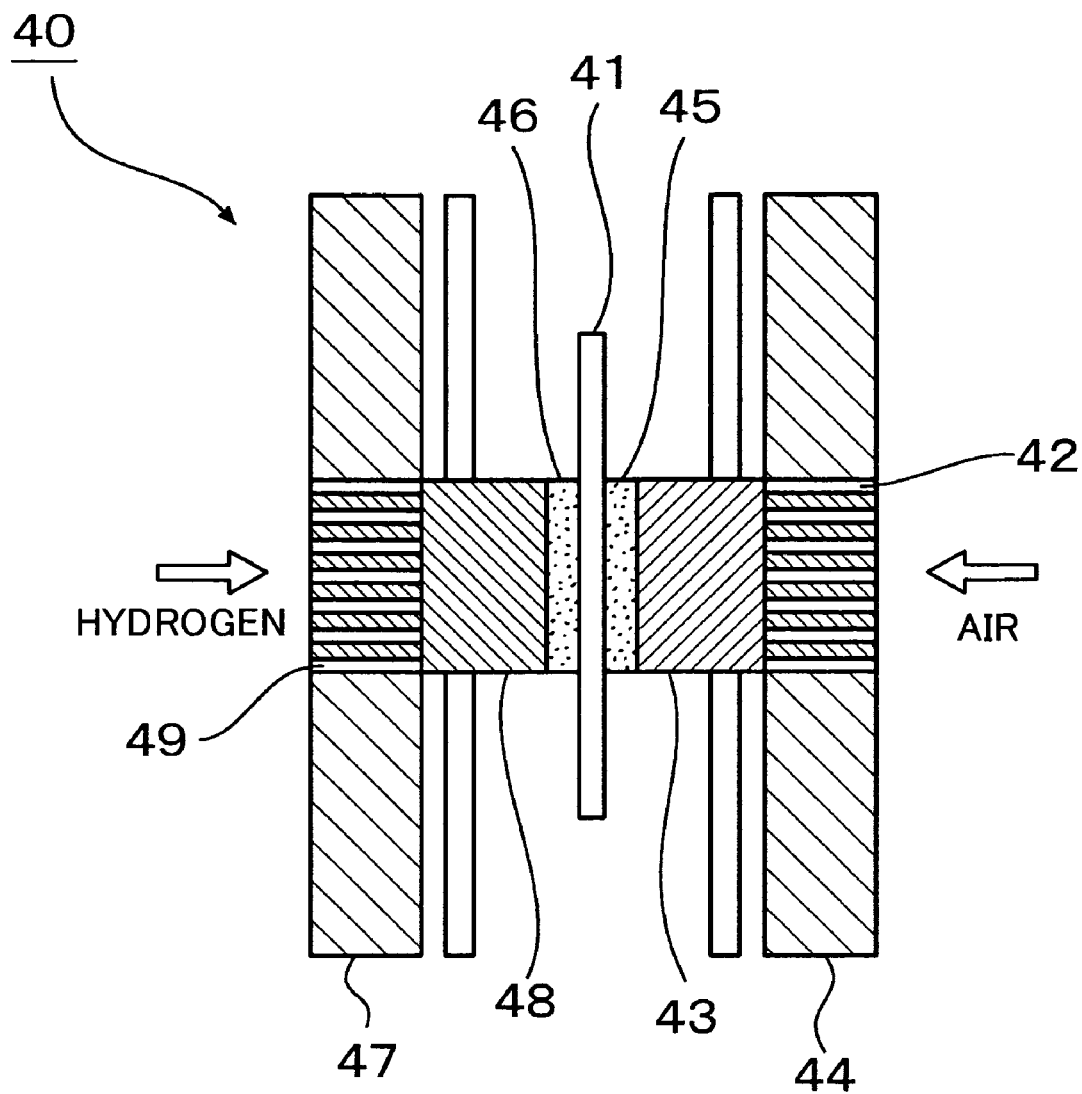
FIG. 5 is a schematic block diagram of a polymer electrolyte fuel cell according to the present invention.

An alcohol solution of pure water and Nafion®, available from E.I. DuPont de Namours and Company, was added to the PtP catalyst with a carbon support that is obtained in Examples 1 to 20 and stirred, and then its viscosity was adjusted to create a catalyst ink. The catalyst ink was then applied onto Teflon® sheet, available also from Dupont, in such a way that the application amount of the PtP catalyst was 0.5 mg/cm$^2$. After dried, the Teflon® sheet was peeled off, thereby creating an oxygen electrode catalyst. Further, an alcohol solution of Nafion® and PtRuP catalyst with a particle diameter of 2 nm supported on acetylene black (AB) with a specific surface area of 68 m$^2$/g, which is a non-porous carbon support were added and stirred, and then its viscosity was adjusted to create a catalyst ink. The catalyst ink was then applied onto Teflon® sheet in such a way that the amount of the PtRuP catalyst was 0.5 mg/cm$^2$. After dried, the Teflon® sheet was peeled off, thereby creating a hydrogen electrode catalyst. Then, the PtP oxygen electrode catalyst and the PtRuP hydrogen electrode catalyst were hot pressed to both sides of a polymer electrolyte membrane (Nafion® membrane 112, available from Dupont), thereby producing a membrane electrode assembly. Using the membrane electrode assembly and hydrogen gas as fuel, a polymer electrolyte fuel cell shown in FIG. 5 was produced. The polymer electrolyte fuel cell 40 of FIG. 5 includes an oxygen electrode side charge collector 44, an oxygen electrode side diffusion layer 43, a polymer electrolyte membrane 41, a hydrogen electrode side diffusion layer 48, a hydrogen electrode side charge collector 47, an air intake opening 42, an oxygen electrode PtP catalyst layer 45, a hydrogen electrode PtRuP catalyst layer 46, and a hydrogen fuel intake opening 49. The oxygen electrode side charge collector 44 serves as a structure to take in the air (oxygen) through the air intake opening 42 and also as a power collector. The polymer electrolyte membrane 41 (Nafion® membrane 112, available from DuPont) serves as a carrier that carries proton generated in the hydrogen electrode to the oxygen electrode and also as a separator that prevents the short-circuit of the hydrogen electrode and the oxygen electrode. In the polymer electrolyte fuel cell 40 having this configuration, the hydrogen gas supplied from the hydrogen electrode side charge collector 47 passes through the hydrogen electrode side diffusion layer 48 and enters the hydrogen electrode catalyst layer 46 where it is oxidized into electron and proton. The proton passes through the polymer electrolyte membrane 41 and moves to the oxygen electrode side. In the oxygen electrode, the oxygen entering from the oxygen electrode side charge collector 44 is reduced by the electron generated in the hydrogen electrode, and this oxygen and the proton react to generate water. The polymer electrolyte fuel cell 40 of FIG. 5 generates electric power by the hydrogen oxidation reaction and the oxygen reduction reaction.

COMPARATIVE EXAMPLE 5

The comparative example 5 produced a polymer electrolyte fuel cell in the same manner as Example 22 except for using the Pt catalyst produced in Comparative Examples 1 to 3 instead of the PtP catalyst with a carbon support in Example 22 as oxygen electrode catalyst.

The power density of each polymer electrolyte fuel cell obtained in Example 22 and Comparative Example 5 was measured. Table 3 shows the measurement results. Since Example 22 used PtP catalyst, a catalyst particle diameter was 2 nm or less. Further, it used a non-porous carbon support or a carbon support that is a porous support with a relatively smaller number of fine pores as a catalyst support. Therefore, catalyst use efficiency increased as catalyst activity increased, and the power density was as high as 220 mW/cm$^2$ or higher. In Table 3, the power density was highest with carbon support of MWCNT, second highest with AB and lowest with CB. The CB produced the lowest power density because CB is a porous support and part of PtP catalyst was buried in the fine pores and unable to contribute to oxygen reduction reaction. Since AB is a non-porous support, it produced a higher power density than the CB support. MWCNT had a large number of physical voids in the electrode catalyst layer because of being non-porous and its shape. This enhanced dispersion of oxygen gas that served as fuel and water that was generated at cathode. Further, since MWCNT had a lower specific resistance than CB, it is possible to reduce IR loss and suppress a decrease in cell voltage, thereby producing high power density. Furthermore, Example 19 synthesized PtP catalyst by lowering a reflux temperature from 200° C. to 130° C., and Example 20 synthesized PtP catalyst by lowering a reflux temperature to 95° C. The reduction in synthesis temperature suppressed growth of catalyst particles, and the particle diameters of PtP catalyst were reduced to 1.8 nm and 1.5 nm, respectively. The decrease in particle diameter increased the specific surface area of catalyst to enhance catalyst activity, and the power density was thereby as high as 240 mW/cm$^2$ or higher. On the other hand, as shown in Comparative Example 5, when using a non-porous MWCNT as a support, the particle diameter of Pt catalyst, which does not contain P, was as large as up to 10 nm, and the power density was 180 mW/cm$^2$. Even when CB with a large specific surface area was used as a support, the particle diameter was still as large as up to 6 nm and the power density increased by only about 10 mW/cm$^2$.

TABLE 3

| Catalyst | Carbon support | Support specific surface area (m$^2$/g) | Catalyst particle diameter (nm) | Catalyst composition (at. %) | Power density (mW/cm$^2$) |
| --- | --- | --- | --- | --- | --- |
| Embodiment 1 | MWCNT | 30 | 2 | $Pt_{86}P_{14}$ | 230 |
| Embodiment 2 | AB | 68 | 2 | $Pt_{86}P_{14}$ | 225 |
| Embodiment 3 | CB | 140 | 2 | $Pt_{86}P_{14}$ | 220 |
| Embodiment 4 | MWCNT | 30 | 2 | $Pt_{87}P_{13}$ | 230 |
| Embodiment 5 | AB | 68 | 2 | $Pt_{87}P_{13}$ | 226 |
| Embodiment 6 | CB | 140 | 2 | $Pt_{87}P_{13}$ | 220 |
| Embodiment 7 | MWCNT | 30 | 2 | $Pt_{88}P_{12}$ | 231 |
| Embodiment 8 | AB | 68 | 2 | $Pt_{88}P_{12}$ | 225 |
| Embodiment 9 | CB | 140 | 2 | $Pt_{88}P_{12}$ | 220 |
| Embodiment 10 | MWCNT | 30 | 2 | $Pt_{89}P_{11}$ | 231 |
| Embodiment 11 | AB | 68 | 2 | $Pt_{89}P_{11}$ | 226 |
| Embodiment 12 | CB | 140 | 2 | $Pt_{89}P_{11}$ | 220 |
| Embodiment 13 | MWCNT | 30 | 2 | $Pt_{86}P_{14}$ | 232 |
| Embodiment 14 | AB | 68 | 2 | $Pt_{86}P_{14}$ | 227 |
| Embodiment 15 | CB | 140 | 2 | $Pt_{86}P_{14}$ | 220 |
| Embodiment 16 | MWCNT | 30 | 2 | $Pt_{85}P_{15}$ | 230 |
| Embodiment 17 | AB | 68 | 2 | $Pt_{85}P_{15}$ | 225 |
| Embodiment 18 | CB | 140 | 2 | $Pt_{85}P_{15}$ | 220 |
| Embodiment 19 | MWCNT | 30 | 1.8 | $Pt_{86}P_{14}$ | 240 |
| Embodiment 20 | MWCNT | 30 | 1.5 | $Pt_{86}P_{14}$ | 250 |
| Comparative example 1 | MWCNT | 30 | to 10 | $Pt_{100}$ | 180 |
| Comparative example 2 | AB | 68 | to 8 | $Pt_{100}$ | 185 |
| Comparative example 3 | CB | 140 | to 6 | $Pt_{100}$ | 190 |

EXAMPLE 23

Bis(acetylacetonato)platinum(II) of 1.69 mmol was dissolved into ethylene glycol of 100 ml and mixed together. Sodium hypophosphite of 0 to 200 mol % of the number of Pt moles was then dissolved into ethylene glycol solution of 100 ml and added to the above solution. Further, ethylene glycol solution of 200 ml where multiwalled carbon nanotube (MWCNT) with a specific surface area of 30 m$^2$/g, which is a non-porous support, of 0.5 g was dispersed was added thereto. A sulfuric acid solution was dropped into this solution, and the pH value was adjusted to 3 by using a pH litmus paper. In a nitrogen gas atmosphere, the solution was stirred and refluxed in an oil bath at 200° C. for 4 hours, thereby depositing PtP catalyst on the multiwalled carbon nanotube. After the reaction ended, filtration, washing, and drying were performed, thereby producing catalyst.

X-ray diffraction analysis was performed on the PtP catalyst obtained in Example 23, and the particle diameter of the PtP catalyst was estimated by applying the Scherrer's formula to the diffraction peak of (220). Then, the composition of the catalyst was observed by XPS. Further, a direct methanol fuel cell was produced with the PtP catalyst in the similar manner as Example 21 and the power density of each cell was measured. Table 4 shows the results. It shows that if the content of P is 2 at. % or higher, the particle diameter of the PtP catalyst is reduced to less than 3 nm and achieves high power density. On the other hand, if the content of P exceeds 50 at. %, the content of Pt decreases to reduce the power density.

TABLE 4

| Amount of sodium hypophosphite added | Catalyst particle diameter (nm) | Catalyst composition (at. %) | Power density (mW/cm$^2$) |
| --- | --- | --- | --- |
| 0 mol % | to 10 | $Pt_{100}$ | 70 |
| 5 mol % | 2.4 | $Pt_{97}P_3$ | 85 |
| 10 mol % | 2.2 | $Pt_{95}P_5$ | 88 |
| 20 mol % | 2.1 | $Pt_{81}P_9$ | 94 |
| 50 mol % | 2.0 | $Pt_{86}P_{14}$ | 100 |
| 100 mol % | 2.0 | $Pt_{78}P_{22}$ | 110 |
| 150 mol % | 1.8 | $Pt_{72}P_{28}$ | 103 |
| 200 mol % | 1.6 | $Pt_{47}P_{53}$ | 70 |

The catalyst composed of PtP may be used as oxygen electrode catalyst of a direct methanol fuel cell (DMFC) and a polymer electrolyte fuel cell (PEFC). It may be also used as an oxygen electrode catalyst layer in a membrane electrode assembly for these fuel cells. The PtP catalyst of the present invention has hydrogen oxidation activity and it may be used as hydrogen electrode catalyst of a polymer electrolyte fuel cell that uses pure hydrogen with no CO poisoning as fuel.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:
1. A fuel cell comprising:
a fuel electrode;
an oxygen electrode; and
a polymer electrolyte membrane placed between the fuel electrode and the oxygen electrode, wherein the oxygen electrode includes a catalyst composed of a nonporous carbon support and at least a Pt particle which is in contact with P particles on a surface of said Pt particle.

2. The fuel cell according to claim 1, wherein a content of P in the catalyst is 2 atomic % to 50 atomic %.

3. The fuel cell according to claim 1, wherein a particle diameter of the catalyst is less than 5 nm.

4. The fuel cell according to claim 3, wherein the particle diameter of the catalyst is 1 nm to 3 nm.

5. The fuel cell according to claim 1, wherein the carbon support has a specific surface area of 300 m$^2$/g and smaller.

6. The fuel cell according to claim 5, wherein the carbon support has a specific surface area of 20 m$^2$/g to 140 m$^2$/g.

7. The fuel cell according to claim 6, wherein the carbon support is one selected from non-porous acetylene black and multiwalled carbon nanotube.

8. The fuel cell according to claim 1, wherein a catalyst used for the fuel electrode is a PtRuP catalyst.

9. A membrane electrode assembly comprising:
a fuel electrode catalyst layer;
an oxygen electrode catalyst layer; and
a polymer electrolyte membrane placed between the fuel electrode catalyst layer and the oxygen electrode catalyst layer, wherein the oxygen electrode catalyst layer includes a catalyst composed of a nonporous carbon support and at least a Pt particle which is in contact with P particles on a surface of said Pt particle.

10. A catalyst for an oxygen electrode of a fuel cell, comprising a nonporous carbon support and at least a Pt particle which is in contact with P particles on a surface of said Pt particle,
wherein said fuel cell comprises:
a fuel electrode;
the oxygen electrode; and
a polymer electrolyte membrane placed between the fuel electrode and the oxygen electrode.

11. A method of producing the catalyst for a fuel cell oxygen electrode according to claim 10, comprising reducing Pt ion with a reducing agent containing phosphorus wherein the phosphorus of the reducing agent containing phosphorus is the source of phosphorus in the P particles.

12. The method according to claim 11, wherein the reducing is performed by one selected from alcohol reduction, electroless plating and ultrasonic reduction.

* * * * *